United States Patent [19]
Mais

[11] Patent Number: 5,922,043
[45] Date of Patent: Jul. 13, 1999

[54] REDUCED HARDWARE LINEAR INTERPOLATOR

[75] Inventor: Paul A. Mais, Long Beach, Calif.

[73] Assignee: LSI Logic Corporation, Milpitas, Calif.

[21] Appl. No.: 08/902,762

[22] Filed: Jul. 30, 1997

[51] Int. Cl.$^6$ ....................................................... G06F 7/38

[52] U.S. Cl. ............................................................. 708/290

[58] Field of Search ...................... 364/723; 345/426–427

[56] References Cited

U.S. PATENT DOCUMENTS

| | | | |
|---|---|---|---|
| 5,148,381 | 9/1992 | Sprague | 364/723 |
| 5,345,541 | 9/1994 | Kelley et al. | 364/723 |
| 5,402,533 | 3/1995 | Kelley et al. | 364/723 |

Primary Examiner—Tan V. Mai
Attorney, Agent, or Firm—Marger Johnson & McCollom, PC.

[57] ABSTRACT

A linear interpolator for determining a weighted average between first and second terms having first and second weights, respectively. The linear interpolator includes a first multiplier for multiplying the first term and an inverse of the second weight to produce a first set of partial products, a second multiplier for multiplying the second term and the second weight to produce a second set of partial products, a carry-save addition ("CSA") tree and an adder. The CSA tree and adder combine the first set of partial products, the second set of partial products, and the first term to produce the weighted average. In another embodiment, the linear interpolator includes a plurality of multiplexers (muxes), the number of muxes being equal to the bit width of the second weight. Each mux selects between the first and second term, depending on whether the corresponding bit of the weight is a zero or one, to produce a plurality of partial products. The partial products are then right aligned a predetermined number of times and added in an accumulator along with the first term, thereby producing the weighted average.

7 Claims, 2 Drawing Sheets

REDUCED HARDWARE LINEAR INTERPOLATOR

BACKGROUND OF THE INVENTION

This invention relates generally to digital electronic circuits and more particularly to a method and apparatus for producing a weighted average of two numbers.

Digital electronic circuits experience increasing requirements for efficiency such as faster operating speed and smaller area requirements. One digital circuit that commonly faces such requirements is a linear interpolator. A linear interpolator is a digital circuit that produces the weighted average of two terms. The weight of the two terms are represented as a percentage, always between 0 and 1. Furthermore, the sum of the two weights is always equal to 1 (100%):

Referring to FIG. 1, a conventional linear interpolator 10 includes two multipliers 12, 14, a carry-save addition ("CSA") tree 16 and an adder 18. To produce a weighted average Z of two term T1 and T2, where the term T1 has a weight of frac1 and the term T2 has a weight of frac2, the following equations apply:

$$frac1 + frac2 = 1 \quad (1)$$

$$Z = T1 \cdot frac1 + T2 \cdot frac2 \quad (2)$$

$$= T1 \cdot (1 - frac2) + T2 \cdot frac2 \quad (3)$$

The conventional linear interpolator 10 has several problems associated with it, concerning both speed and area. The (1-frac2) weight must always be resolved before the multiplication can precede, such resolution being in the critical speed path in the linear interpolator. The speed of the linear interpolator 10 is directly dependent on the number of consecutive "levels" of logical operations, such as additions or subtractions. Therefore, the extra level of addition required by the (1-frac2) operation not only requires extra circuitry, but hinders the speed of the linear interpolator 10.

Furthermore, each multiplier 12, 14 creates a series of partial products which is then reduced to a sum and carry term S1, C1 and S2, C2, respectively. The four terms S1, C1, S2, C2 are further reduced and accumulated by the CSA tree 16 before a final propagation add is performed by the adder 18 to produce the result Z of the linear interpolation. Typically, reduction and accumulation operations reduce groups of three terms into groups of two terms. Although several groups of three terms may be reduced in parallel for each level, the resulting groups of two terms must then be recombined into groups of three which are reduced again.

For example, consider that both the term T1 and the weight frac1 are six bit numbers and a full adder can accommodate three bits. The multiplication process for T1·frac1 produces six partial products: aaaaaa, bbbbbb, cccccc, dddddd, eeeeee, fffff, before it produces the sum S1 (nnnnnnnnn) and carry C1 (ooooooo):

$$T1 \text{ (6 bits)} \quad (4)$$

$$\times frac1 \text{ (6 bits)}$$

$$
\begin{array}{l}
aaaaaa \\
bbbbbb \\
cccccc \\
dddddd \\
eeeeee \\
\underline{fffff} \\
S1 \text{ and } C1
\end{array}
$$

| Level 1 | aaaaaa | (5) |
| | bbbbbb | |
| | cccccc | |
| | hhhhhhhh (intermediate product) | |
| | iiiii (intermediate carry) | |
| | dddddd | (6) |
| | eeeeee | |
| | fffff | |
| | jjjjjjj (intermediate product) | |
| | kkkkkk (intermediate carry) | |
| Level 2 | hhhhhhhh | (7) |
| | iiiii | |
| | jjjjjjj | |
| | llllllll (intermediate product) | |
| | mmmmmm (intermediate carry) | |
| Level 3 | llllllll | (8) |
| | mmmmmm | |
| | kkkkkk | |
| | nnnnnnnnn (S1) | |
| | ooooooo (C1) | |

Therefore, for a linear interpolator with 6-bit fractal weights (frac1, frac2), there are 6 partial products which require three levels of full addition in each multiplier 12, 14. In addition, since the results from the multipliers 12, 14 (terms C1, S1, C2 and S2) are being provided to the CSA tree 16, an extra two levels of addition for the CSA tree are also required to reduce the four terms to two (terms A1, A2). Also, the adder 18 requires an additional level of addition before producing the weighted average Z along with the level of addition required for the (1-frac2) operation. As a result, many levels of addition are required, which affects adversely the speed of the linear interpolator 10. Furthermore, with an increase in the number of partial products, the number of addition levels increases logarithmically.

SUMMARY OF THE INVENTION

The foregoing problems are solved and a technical advance is achieved by an improved linear interpolator that determines a weighted average between first and second terms having first and second weights, respectively. In one embodiment, the linear interpolator includes a first multiplier for multiplying the first term and an inverse of the second weight and for producing a first set of partial products, a second multiplier for multiplying the second term and the second weight and for producing a second set of partial products, a CSA tree and an adder. The adder CSA tree and combine the first set of partial products, the second set of partial products, and the first term to produce the weighted average.

In another embodiment, an improved linear interpolator includes a plurality of multiplexers (muxes), the number of muxes being equal to the bit width of the second weight. Each mux selects between the first and second term, depending on whether a corresponding bit of the weight is a zero or one, to produce a plurality of partial products. The partial products are then aligned in a predetermined manner and added in an accumulator along with the first term, thereby producing the weighted average.

DETAILED DESCRIPTION OF THE PREFERRED EMBODIMENT

Figure 1:
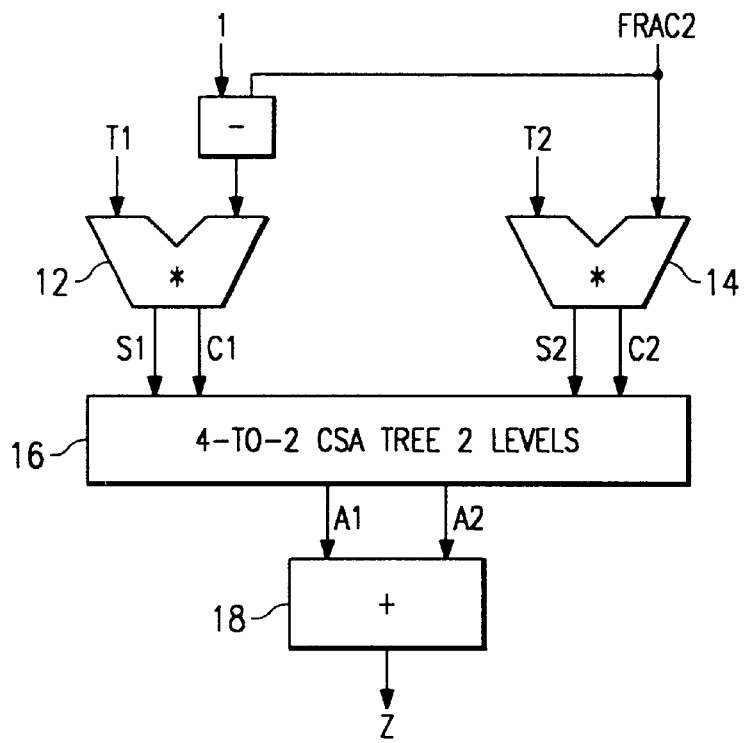
FIG. 1 is a diagram of a conventional linear interpolator.

As described above, FIG. 1 is a diagram of a conventional linear interpolator.

Figure 2:
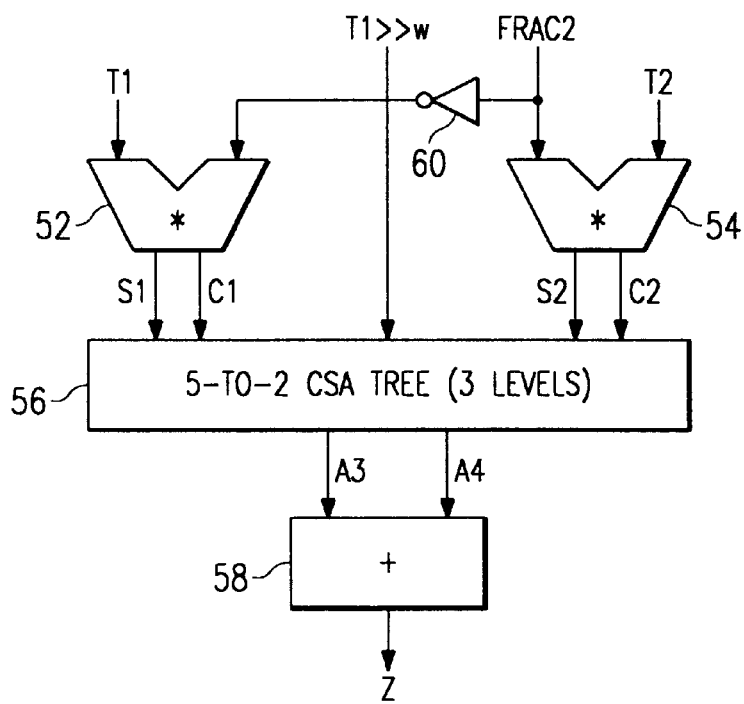
FIG. 2 is a diagram of a first embodiment of a linear interpolator employing features of the present invention.

Referring to FIG. 2, a first embodiment of an improved linear interpolator is designated by the reference numeral 50. The linear interpolator 50 includes two multipliers 52, 54, a CSA tree 56, and an adder 58 to produce the weighted average Z of two terms T1 and T2 having fractal weights frac1 and frac2, respectively. Although the linear interpolator 50 has the same terms, fractal weights, and weighted average as the conventional linear interpolator 10 (FIG. 1), the inputs and/or outputs to the multiplier 52, the CSA tree 56 and adder 58 are different than those of the conventional linear interpolator 10. Furthermore, the linear interpolator 50 includes an inverter 60, all of which is discussed in greater detail, below.

Both fractal weights frac1 and frac2 can be represented as a binary number 0.w, where w is the number of bits used to represent the fractal weight. Referring to equations (1) and (3) above, rather than find 1-frac2 directly with a subtractor and its associated delay, 1-frac2 is expressed as a sum of two terms. For example, conside: w=6, frac1=0.010011 and frac2=0.101101, then it can be shown that:

$$1 - frac2 = 1.000000 - 0.101101 \quad (9)$$

$$= 0.010011$$

$$= 0.010010 + 0.000001$$

$$= frac2^* + 1 \gg 6$$

(where frac2*=NOT(frac2), and where 1>>6=1right-aligned w bits).

Using equations (3) and (9), it can be shown that:

$$Z = T1 \cdot (1 - frac2) + T2 \cdot frac2 \quad (10)$$

$$= T1 \cdot (frac2^* + 1 \gg w) + T2 \cdot frac2$$

$$= T1 \cdot frac2^* + T1 \cdot 1 \gg w + T2 \cdot frac2$$

$$= T1 \cdot frac2^* + T1 \gg w + T2 \cdot frac2$$

Therefore, the multiplier 52 has inputs of T1 and frac2* and outputs a sum S4 and a carry C4; the multiplier 54 has inputs of T1 and frac2 and outputs the sum S2 and the carry C2; the CSA tree 56 has inputs of S4, C4, S2, C2, and T1>>w and outputs two terms A3 and A4; and the adder 58 has inputs of A3 and A4 and outputs the weighted average Z. As a result, the linear interpolator 50 does not require the operation for (1-frac2) and only adds a minimal extra delay for the inverter 60.

Figure 3:
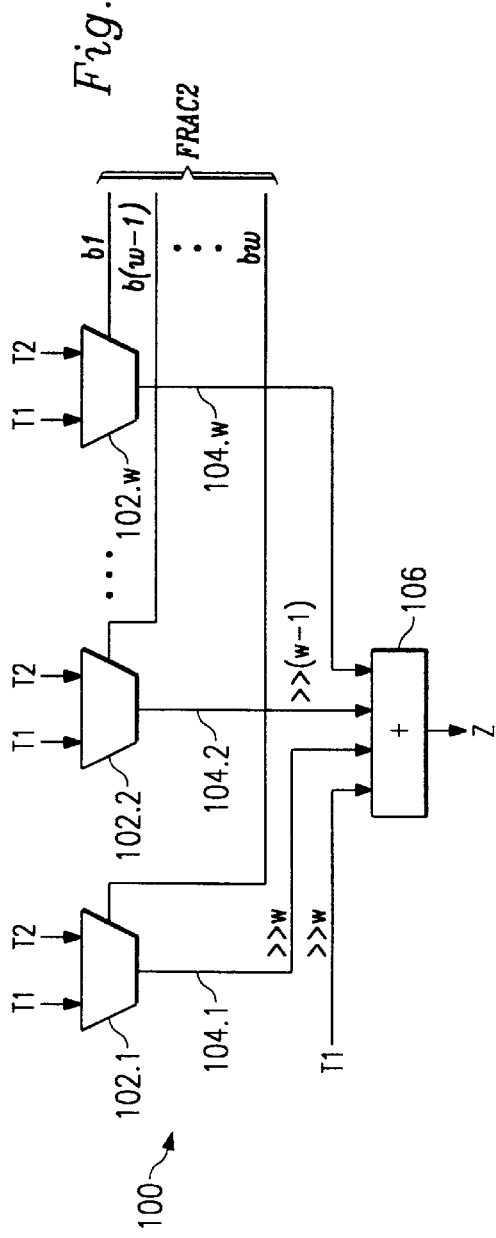
FIG. 3 is a diagram of a second embodiment of a linear interpolator employing features of the present invention.

Referring to FIG. 3, a second embodiment of a linear interpolator is designated by the reference numeral 100. The linear interpolator 100 takes advantage of the fact that the fractal weights frac2 and frac2* are bitwise inverts of each other. Because of this inverse relationship, the multipliers 52, 54 (FIG. 2) will always produce a total of w partial products that are equal to zero and w partial products equal to either T1 or T2. Furthermore, exactly one partial product of zero will exist for every partial product position in either multiplier 52 or 54. For example, consider: w=4, T1=0111, T2=0001, and frac2=1011, then:

| Multiplier 52 | | Multiplier 54 | |
|---|---|---|---|
| 0111 (*T1*) | | 0001 (*T2*) | |
| ×0100 (*frac2**) | | ×1011 (*frac2*) | |
| 0000 | ⇐ zero | 0001 (*T2*) | |
| 0111 (*T1*) | zero ⇒ | 0000 | |
| 0000 | ⇐ zero | 0001 | (*T2*) |
| 0000 | ⇐ zero | 0001 | (*T2*) |
| 00011100 | | 00001011 | |

As seen in FIG. 3, and proceeding from right to left, the present invention takes advantage of this inverse relationship. Accordingly, muxes 102.1, 102.2 . . . 102.w are used to produce partial products 104.1, 104.2 . . . 104. w, respectively. The muxes are controlled by a single bit of frac2, such that the most significant bit (b1) of frac2 controls the mux 102.w, . . . the second least significant bit (b(w−1)) of frac2 controls the mux 102.2, and the least significant bit (bw) of frac2 controls the mux 102.1. The outputs 104.1, 104.2 . . . 104.w are then fed into an accumulator 106, along with the term T1 such that the term T1 is right-aligned w times (T1>>w), the output 104.1 is right-aligned w times, the output 104.2 is right-aligned (w−1) times, . . . and the output 104.w is right-aligned once. This type of right-aligning, where the previous output is right-aligned once more than the next output, is called "progressive alignment." Since the amount of right-aligning is known in advance, the terms can be correctly aligned by simply creating the proper connections from the muxes 102 and the term T1 to the accumulator 106.

Figure 4:
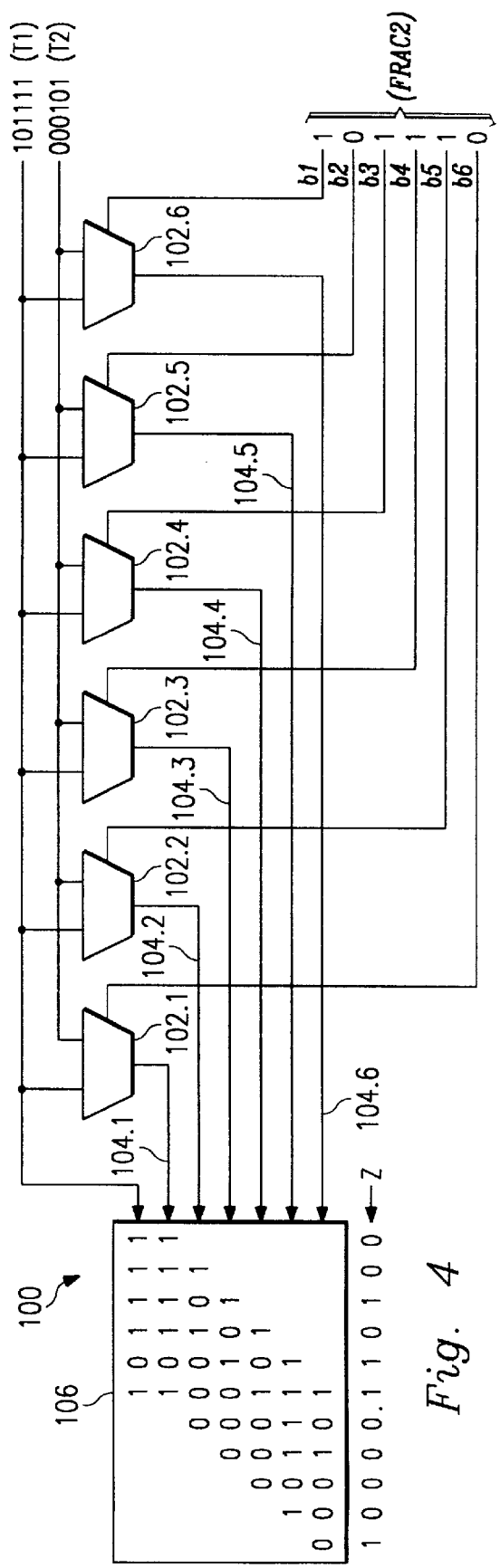
FIG. 4 illustrates a specific example for the linear interpolator of FIG. 3.

Referring to FIG. 4, for the sake of example, w=6, T1=47 (101111), T2=5 (000101), frac1=0.28125 (010010), and frac2=0.71875 (101110). Each of T1 and T2 are supplied as inputs of muxes 102.1, 102.2, 102.3, 102.4, 102.5, and 102.6. A single bit of the term frac2 is also supplied to each mux, as illustrated. As a result, the partial products are provided to the accumulator 106 with a final result of:

Z=16.8125 (10000.110100)

It can be seen in accumulator 106 of FIG. 4 that the first term T1, by being right-aligned w times (T1>>w), becomes shift-aligned with the least significant bit ("LSB") of the sum of the partial products.

The above organization interleaves two multipliers into one, completely eliminating one multiplier's partial product selection and accumulating hardware, while only minimally complicating the linear interpolator 100. This organization also eliminates the need for the CSA tree 16 (FIG. 1) and its associated delay. Furthermore, this technique can be used on any linear interpolator, regardless of the width of the terms or their respective weights. The only condition is that the weights are represented as binary fractions, and that they total to 1. Unlike other methods for reducing partial products, such as those where the multipliers utilize Booth's Algorithm, this organization always cuts the partial product count in half, increases the speed of the device, and reduces the area by saving many half and full-adders. Finally the overall design is not constrained to any particular technology or implementation.

Although illustrative embodiments of the invention have been shown and described, a wide range of modifications, changes and substitutions are contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A linear interpolator for determining a weighted average between first and second terms having first and second weights espectively, the second weight comprising a plurality of bits, the linear interpolator comprising:

a plurality of muxes, each having a first input for the first term and a second input for the second term, the first and second inputs being selected by one of the plurality of bits of the second weight; and an accumulator coupled with each of the muxes for adding the first term and the selected input from each of the plurality of muxes for producing the weighted average.

2. The linear interpolator of claim 1 wherein the sum of the first and second weights equal one.

3. The linear interpolator of claim 1 wherein before each of the selected input from each of the plurality of muxes is added by the accumulator, it is right-aligned a predetermined number of times.

4. A linear interpolator for determining a weighted average between first and second terms, wherein the second term has a weight of a predetermined number of bits, the linear interpolator comprising:

a plurality of muxes equal to the predetermined number of bits, wherein each mux has a first input for the first term and a second input for the second term, wherein each mux is controlled by one bit of the weight, a different bit for each mux, and wherein each mux selects between the first and second inputs to produce a partial product; and an accumulator coupled with each of the muxes for adding the first term and the partial products from each of the muxes in order to produce the weighted average.

5. The linear interpolator of claim 4 wherein each of the partial products is binary place-aligned before being added by the accumulator.

6. A method in a linear interpolation circuit for determining a weighted average between first and second terms, wherein the second term has a weight of a predetermined number of bits, the method comprising:

for each of the predetermined number of bits, selecting one of either the first term or the second term as a partial product; and progressively right-aligning each of the partial products;

adding the first term and the progressively right-aligned partial products to produce the weighted average.

7. The method of claim 6 wherein the first term is also right-aligned before it is added.

* * * * *